Aug. 7, 1956  R. T. ADAMS  2,758,278
PHASE COMPARATOR
Filed Feb. 12, 1952  2 Sheets-Sheet 1
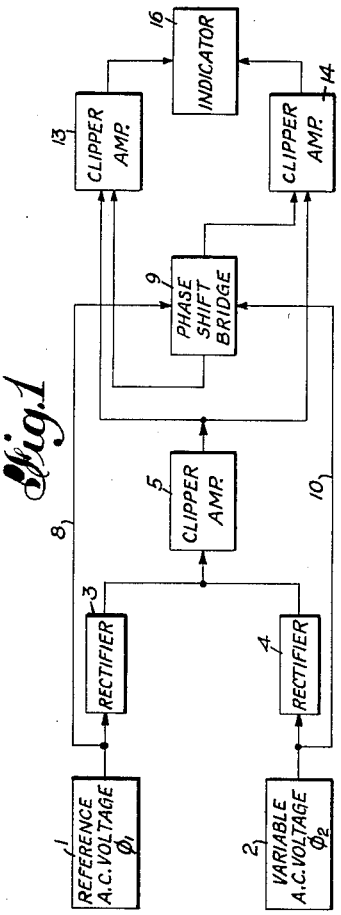
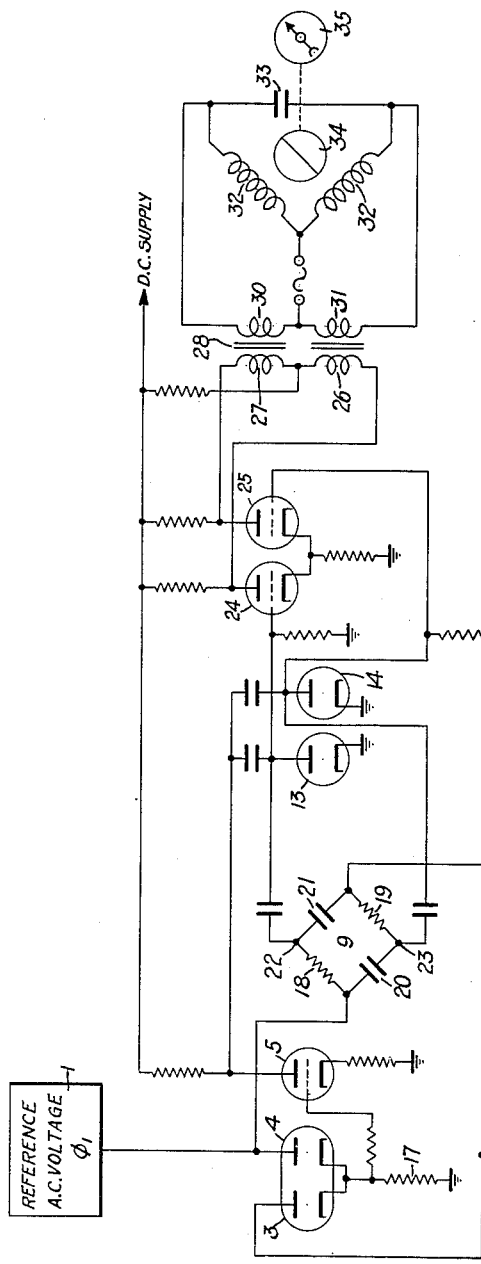
INVENTOR
ROBERT T. ADAMS
BY
ATTORNEY

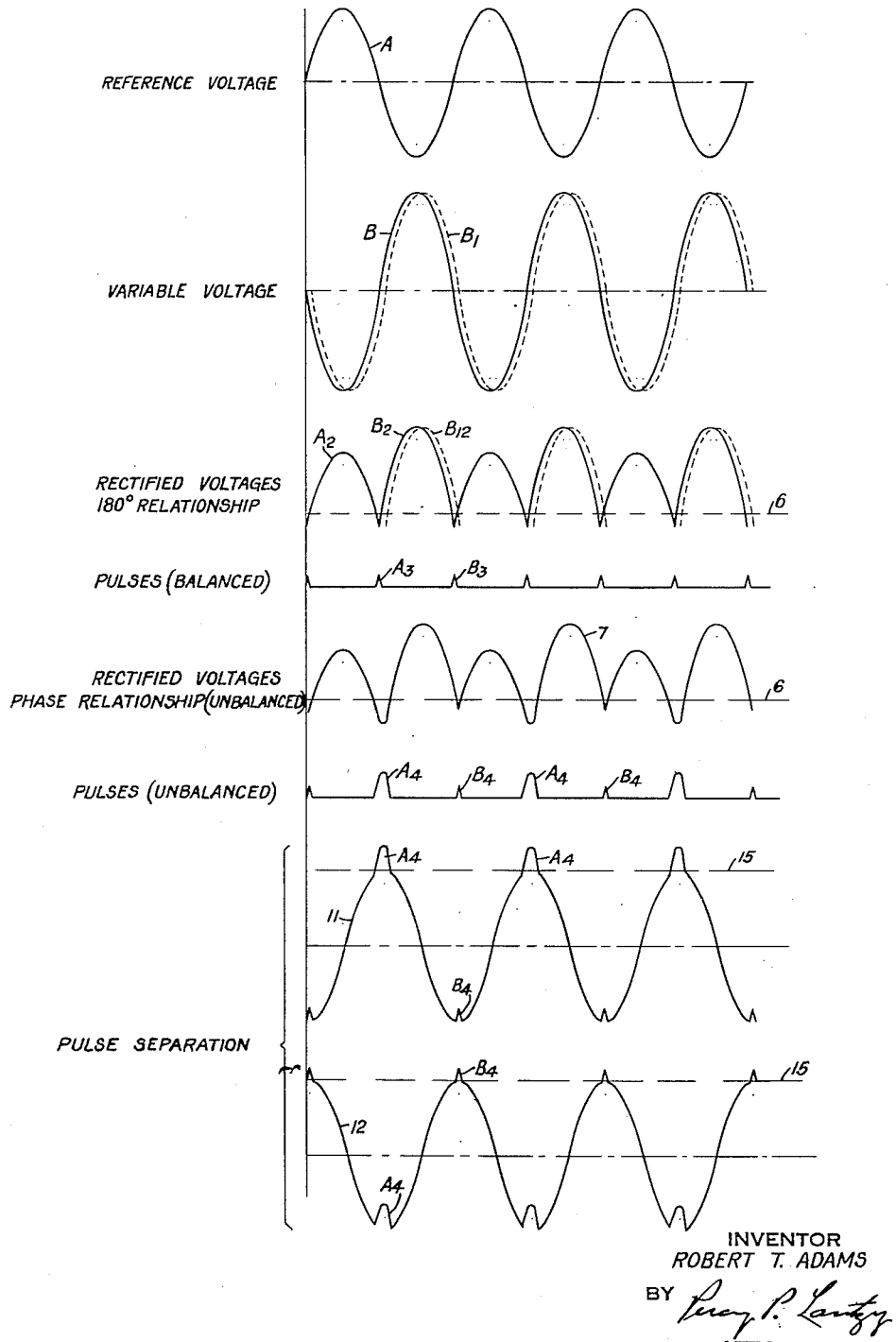

United States Patent Office 2,758,278
Patented Aug. 7, 1956

2,758,278

PHASE COMPARATOR

Robert T. Adams, Short Hills, N. J., assignor to International Telephone and Telegraph Corporation, a corporation of Maryland Application February 12, 1952, Serial No. 271,269

11 Claims. (Cl. 324—87)

The present invention relates to phase comparators for accurately determining the phase relationship between two signal voltages of the same frequency.

Various means and method have in the past been used for comparing the phase relationship between two signals, and for certain purposes not requiring a high degree of accuracy, such means and method have been satisfactory. However, for certain other purposes such as, for example, when the relative location of two points, or the relative change of position between two points, is determined by a method of signal phase comparison, it is imperative to have available means for determining with a high degree of accuracy the phase relationship between two such signals.

Therefore, the principal object of this invention is to provide a phase comparator more sensitive to small phase changes between two signals of the same frequency than comparators heretofore known.

A subordinate object is to provide a phase shift bridge network for effecting a given phase shift to two input waves of like frequency regardless of variations in amplitude of the input waves.

One of the features of this invention is the means for determining the phase relationship between two alternating voltages of the same frequency in such a manner that the accuracy of such determination is independent of changes in the relative amplitude of the voltages being compared. For example, means are provided for rectifying the two waves to produce a cusp-like output from which a pulse train is obtained. Successive pulses vary in amplitude according to the variation from a given phase relationship of the two input waves. By converting energy of the input waves into two waves of equal amplitude and shifted in phase by 90°, such wave energy can be used as gating potentials for the separation of the phase indicating pulses. With the pulse energy thus separated, the relative amplitude of the separated pulses can be detected and indicated in a voltage comparison device. When the two pulse voltages are equal, a predetermined phase balance is indicated. If the one pulse voltage is greater or less than the other, then a phase unbalance is indicated, one wave leading or lagging the other depending upon the direction of unbalance.

The above-mentioned and other features and objects of this invention and the manner of attaining them will become more apparent by reference to the following description taken in conjunction with the accompanying drawings, wherein:

Fig. 1 is a block diagram of a phase comparator according to the principles of this invention;

Fig. 2 is a schematic circuit diagram of the comparator of Fig. 1; and

Fig. 3 illustrates certain waveforms helpful in explanation of the invention.

Referring to Fig. 1, two wave sources 1 and 2 of like frequency are shown, wave source 1 being a reference A. C. voltage and source 2 being a variable A. C. voltage, approximately 180° different in phase from the wave of source 1. Change in the phase relationship between the variable and reference voltages are determined by the comparator of the present invention by first applying the waves from sources 1 and 2 to rectifiers 3 and 4 whereby the rectified output of the two rectifiers produces a combined wave having cusps similarly to that of a full rectified wave. This is shown in Fig. 3 wherein curves A and B represent the reference and variable voltages, respectively. The combined rectified wave of the two A. C. voltages is shown at $A_2$ and $B_2$. The wave B is shown to be of a magnitude different from that of the reference wave A although they may be of the same magnitude. If they were of the same magnitude, the D. C. portions of the rectified wave $A_2$, $B_2$ would be uniform. As shown, the two input waves A and B are of different magnitude. Regardless of variation in magnitude of waves A and B, cusps are formed substantially as indicated and when the rectified wave is applied to a clipper amplifier 5 whereby the cusp portions are clipped along a level 6, a train of substantially uniform pulses is obtained. When the variable A. C. voltage B varies from 180° phase relation with respect to reference voltage A as indicated by the broken line $B_1$ rectification of the wave $B_1$ will produce rectified portions $B_{12}$. The combined rectified wave, however, takes the shape shown at 7 wherein the cusps are varied in amplitude level so that when the wave is clipped along a level 6 a train of unbalanced pulses $A_4$, $B_4$ results. It will be observed that pulses $A_4$ are of greater amplitude than pulses $B_4$ which indicates variable wave $B_1$ is either leading or lagging the 180° phase relationship. The present illustration indicates a leading relationship.

In order to provide for separation of the pulses $A_4$ and $B_4$ use is made of the input waves A and B. The reference wave A is applied over connection 8 to a phase shift bridge network 9 and the variable voltage wave B is applied over connection 10 to the same bridge network but at diametrically opposite point. The bridge network 9 provides an output of two waves 11 and 12 shifted in phase by 90° from the two input waves as indicated in Fig. 3. These two waves are of equal amplitude regardless of variations in magnitude of the input waves and are in turn applied to clipper amplifier gating devices 13 and 14. The gates are preferably biased so that they will not pass any voltages under voltage level 15 which corresponds to the voltage crest of the two output waves 11 and 12. The pulse output from clipper amplifier 5 is also applied to the gate deices 13 and 14 so that they coincide with the curves 11 and 12 substantially as indicated in Fig. 3. The gate device 13, for example, will operate to pass pulse energy in accordance with pulses $A_4$ while the gate device 14 passes pulse energy in accordance with pulses $B_4$. The pulse output of these gate circuits are preferably amplified and applied to an indicator 16 for comparison.

For a more detailed understanding of the comparator, reference may be had to Fig. 2 which shows schematically the circuit represented by the block diagram of Fig. 1. Rectifiers 3 and 4 may comprise a pair of diodes in a common envelope having a common cathode load resistor 17. Any rectifier may be used so long as the one used at 3 and 4 have substantially equal rectifying characteristics. The waves A and B of voltage sources 1 and 2 are applied to the anodes of the two diodes. The combined output of the two rectifiers such as represented by the curve $A_2$, $B_2$, Fig. 3, is taken across the load resistor 17 and applied to the control grid of a triode clipper amplifier 5 suitably biased to amplify and clip the cusps of the input wave. The output pulses from the anode circuit of clipper 5 are applied across two gating circuits represented by tubes 13 and 14.

The phase shift bridge network 9 comprises a pair of resistors 18 and 19 and a pair of capacitors 20 and 21. These resistors and capacitors are arranged alternately in the four legs of the bridge to effect a 90° phase shift. The reference voltage A is applied to one side of the bridge while the variable voltage B is applied to the other side. The output voltages of terminals 22 and 23 are in turn applied to the gate tubes 13 and 14 for biasing operation of the gates. The output of the two gates are in turn applied to amplifiers 24 and 25 for amplification and application to the primaries 26 and 27 of a coupling transformer 28. The secondaries 30 and 31 of the transformer are coupled to the field windings 32 and 33 of a reversible motor 34 for operation of indicator 35.

When equal pulse potentials are applied to the control grids of tubes 24 and 25, equal and opposite currents will flow through the two halves of the primary windings 26 and 27, and a balanced condition will exist thus causing the motor 34 to remain stationary. If one of the tubes 24 or 25 draws more current than the other, a corresponding unbalance of the currents flowing through the primary windings will tend to saturate one and decrease the saturation of the other with the effect that the motor will tend to rotate in one direction or the other depending on which of the pulses $A_4$ or $B_4$ are of greater magnitude. The direction of rotation of the motor will indicate whether the phase shift of the variable phase voltage is leading or lagging the reference voltage, and the speed of rotation will be an indication of the amount of phase shift. The indicator 35 may, of course, be calibrated and suitably provided with a friction drive or other arrangement to indicate the direction of rotation and the amount of phase variation.

While I have described above the principles of my invention in connection with specific apparatus, it is to be clearly understood that this description is made by way of example only and not as a limitation to the scope of my invention as set forth in the objects thereof and in the accompanying claims.

I claim:

1. In a phase comparator for determining variation from a given phase relationship between first and second alternating current voltages of equal frequency; means to rectify said first voltage, means to rectify said second voltage, means common to the output of both said rectifying means to produce pulses corresponding to the cusps formed by interaction of the rectified voltages, means responsive to said first and second voltages to produce third and fourth voltage waves displaced substantially 90° in phase from said first and second voltages, a pair of gating circuits, means to apply said pulses to both said gating circuits and means to apply said third voltage wave to one of said gating circuits and means to apply said fourth voltage wave to the other of said gating circuits, said gating circuits being biased by said third and fourth waves so as to pass said pulses when said pulses coincide substantially with the crests of said third and fourth waves, and means for detecting inequality between successive pulses to indicate the phase comparison.

2. In a phase comparator according to claim 1, wherein the two rectifying means comprise a double rectifier with separate anodes and a common cathode, and means to apply said first voltage to one of said anodes and means to apply the second voltage to the other of said anodes.

3. In a phase comparator according to claim 1, wherein the means responsive to said first and second voltages for producing said third and fourth voltage waves includes a bridge circuit having two opposite junctions to which said first and second voltages are applied and two additional opposite junctions from which said third and fourth voltages are obtained.

4. In a phase comparator according to claim 3, wherein said bridge circuit comprises a pair of resistors and a pair of capacitors with the resistors and capacitors arranged alternately in the four legs of the bridge.

5. In a phase comparator according to claim 1, further including a voltage comparison circuit and indicator, and means to apply the outputs of said gating circuits to said comparison circuit for operation of said indicator according to variation of said first and second waves from said given phase relationship.

6. In a phase comparator according to claim 5, wherein said given phase relationship is 180°.

7. In a phase comparator for determining variation from a given phase relationship between first and second alternating current voltages of equal frequency; rectifying means for said first voltage, rectifying means for said second voltage, and means common to the output of both said rectifying means to produce, in accordance with the interaction of the rectified voltages of said first and second voltages, pulses corresponding to the cusps formed therefrom, the inequality of the amplitude of successive ones of said pulses being indicative of the phase deviation of said first and second voltages, and means for detecting inequality between successive pulses.

8. In a phase comparator according to claim 7, wherein said means to detect said inequality includes an indicator, and means to apply said pulses to said indicator to provide an indication of the sense of any phase deviation between said first and second voltages.

9. In a phase comparator according to claim 8, wherein the means for applying pulses to said indicator includes two gating circuits, means to apply said first and second voltages with one displaced substantially 90° in phase to said gating circuits respectively, means to apply said pulses to both said gating circuits, said gating circuits being biased to pass said pulses when said pulses coincide substantially with the crests of the voltage waves applied thereto.

10. In a phase comparator for determining variation from a given phase relationship between first and second alternating current voltages of equal frequency; rectifying means for said first voltage, rectifying means for said second voltage, means common to the output of both said rectifying means to produce, in accordance with the interaction between the rectified voltages of said first and second voltages, pulses corresponding to the cusps formed therefrom, means responsive to said first and second voltages to produce third and fourth voltage waves, the third wave being at equal phase angles with respect to said first and second voltage waves in such a sense as to lag both said first and second voltage waves and the fourth wave being at different phase angles with respect to said first and second voltage waves in such a sense as to lead said first voltage wave and lag said second voltage wave, and means to determine the sense of the phase deviation by the time relationship of the larger of said pulses with respect to the crests of said third and fourth voltage waves.

11. In a phase comparator according to claim 10, wherein the last named means includes a pair of gating circuits, means to apply said pulses to both said gating circuits, means to apply said third voltage wave to one of said gating circuits and means to apply said fourth voltage wave to the other of said gating circuits, said gating circuits being biased by said third and fourth waves so as to pass said pulses when said pulses coincide substantially with the crests of said third and fourth waves.

No references cited.